United States Patent

Meyer

[11] Patent Number: 5,846,017
[45] Date of Patent: *Dec. 8, 1998

[54] SIDEWINDER CLIP

[75] Inventor: Charles Meyer, New Lenox, Ill.

[73] Assignee: Illinois Tool Works Inc., Glenview, Ill.

[*] Notice: The term of this patent shall not extend beyond the expiration date of Pat. No. 5,807,018.

[21] Appl. No.: 856,930

[22] Filed: May 15, 1997

Related U.S. Application Data

[63] Continuation-in-part of Ser. No. 705,338, Aug. 29, 1996, Pat. No. 5,807,018.

[51] Int. Cl.$^6$ ....................................... F16B 2/22
[52] U.S. Cl. ................. 403/397; 403/399; 248/74.2; 248/316.7; 24/455; 24/297
[58] Field of Search ....................... 403/397, 398, 403/399, 389, 405.1, 406.1, 364, 384; 24/455, 570, 297; 248/74.2, 316.7, 68.1, 462, 74.1, 74.3, 49; 206/48, 47, 53, 50

[56] References Cited

U.S. PATENT DOCUMENTS

| | | | |
|---|---|---|---|
| 3,491,971 | 1/1970 | Fisher | 248/74.2 X |
| 4,195,807 | 4/1980 | Llauge | 248/74.2 |
| 4,369,946 | 1/1983 | Palmer et al. | 248/74.2 |
| 4,440,371 | 4/1984 | Wijsman | 248/316.7 X |
| 4,566,660 | 1/1986 | Anscher et al. | 248/316.7 X |
| 4,655,424 | 4/1987 | Oshida | 248/74.2 X |
| 4,865,281 | 9/1989 | Wollar | 248/74.2 X |
| 4,917,340 | 4/1990 | Juemann et al. | 248/74.2 |
| 5,129,607 | 7/1992 | Satoh | 248/74.2 X |
| 5,704,573 | 1/1998 | De Beers et al. | 248/74.2 X |

*Primary Examiner*—Harry C. Kim
*Attorney, Agent, or Firm*—Kane,Dalsimer,Sullivan, Kurucz, Levy, Eisele and Richard, LLP

[57] ABSTRACT

A routing clip for fixing at least one conduit to a support is integrally molded from a plastic material and includes U-shaped channels, each having two substantially parallel walls extending therefrom. One of the walls has an inwardly curving projection extending beyond the centerline of the respective U-shaped channel. The inwardly curving projection prevents a tube or conduit, secured within the U-shaped channel, from being readily removed therefrom.

8 Claims, 6 Drawing Sheets

SIDEWINDER CLIP

CROSS-REFERENCE TO RELATED APPLICATIONS

This is a continuation-in-part (CIP) of U.S. patent application Ser. No. 08/705,338 filed on Aug. 29, 1996, now U.S. Pat. No. 5,807,018.

BACKGROUND OF THE INVENTION

1. Field of the Invention

The present invention is directed to a routing clip, and more particularly to such a clip for securing conduits such as piping, tubes, sheaths and cables of various kinds to fixed members, such as apertured partitions or walls, and provided with means for positively holding and maintaining the conduits substantially against any movement with respect thereto. More particularly still, the present invention is a clip of this type molded integrally from a plastic material and including a projection, rather than a hinge mechanism, for holding a conduit therein.

2. Description of the Prior Art

Motor vehicles have numerous conduits whose function is to supply various parts of the vehicle with pressurized fluid, or mechanical or electrical energy. For safety reasons, it is desirable for such tubing or cables to be fixed substantially immobile to vehicle walls or surfaces by means of some suitable support or clamp. Such a support or clamp must not only hold the tubing or cable substantially immobile, but must further be positively secured to the wall or other surface so as to avoid the inadvertent removal thereof due to vibration or other forces encountered when the vehicle is in operation. Prior art supports in the form of securing collars for receiving such tubing or cables by merely clipping thereon have not consistently met these requirements.

Hinged clips have been developed and enable such tubing or cables to be more positively held within the clip. Unfortunately, hinged clips can be closed inadvertently before tubing or cables are placed therein, and, in such cases, must be removed and replaced by another of the same type. Further, the hinge members themselves, being of thin material to permit flexing, often break prematurely, allowing the tubing or cables to shake loose from the clip.

The present invention is a routing clip which includes means, other than a hinged mechanism, for holding tubing or a cable therein.

SUMMARY OF THE INVENTION

Accordingly, the present invention is a routing clip for fixing conduits, such as tubes, to a support, such as an apertured partition or wall. The routing clip is integrally molded from a plastic material and comprises at least one U-shaped channel into which the conduit is to be disposed.

Two substantially parallel walls extend from each U-shaped channel. Each U-shaped channel has an inwardly curving projection either at the end of or atop one of the parallel walls. This projection curves inwardly toward the centerline of the U-shaped channel and substantially crosses the centerline. The profile of this projection minimizes the force necessary for inserting the conduit into the routing clip while maximizing the retention of the conduit within the routing clip.

The present invention will now be described in more complete detail, with frequent reference being made to the following set of drawing figures.

DETAILED DESCRIPTION OF THE PREFERRED EMBODIMENTS

The aforementioned figures illustrate a routing clip 20 in which identical numerals in each figure represent identical elements.

Figure 1:
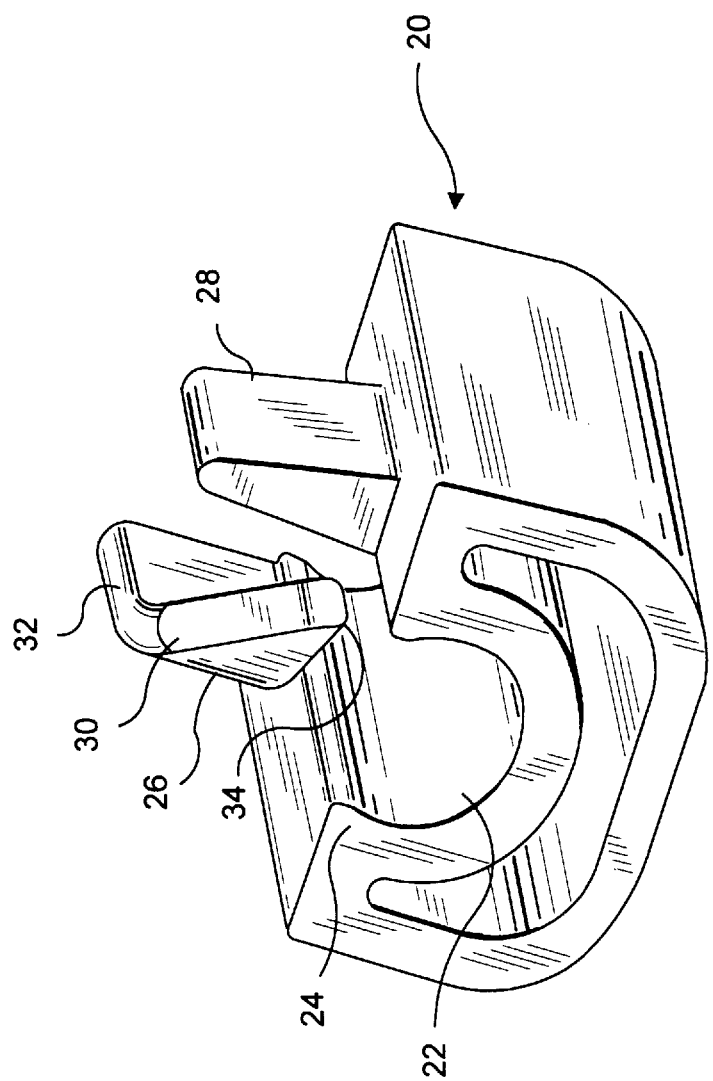
FIG. 1 is a perspective view of a first embodiment of the routing clip of the present invention.

FIG. 1 is a perspective view of a routing clip 20 in accordance with a first embodiment of the present invention. This first embodiment of the present invention is directed at securing a single conduit to a support. The routing clip 20 is integrally molded from a resilient material, preferably nylon 6/6, and comprises a U-shaped channel 22 having two substantially parallel upstanding walls 24. At an end of one of the two walls 24 is an inwardly curving projection 26, and projecting from the other of the two walls 24 is a guide wall 28.

Figure 2:
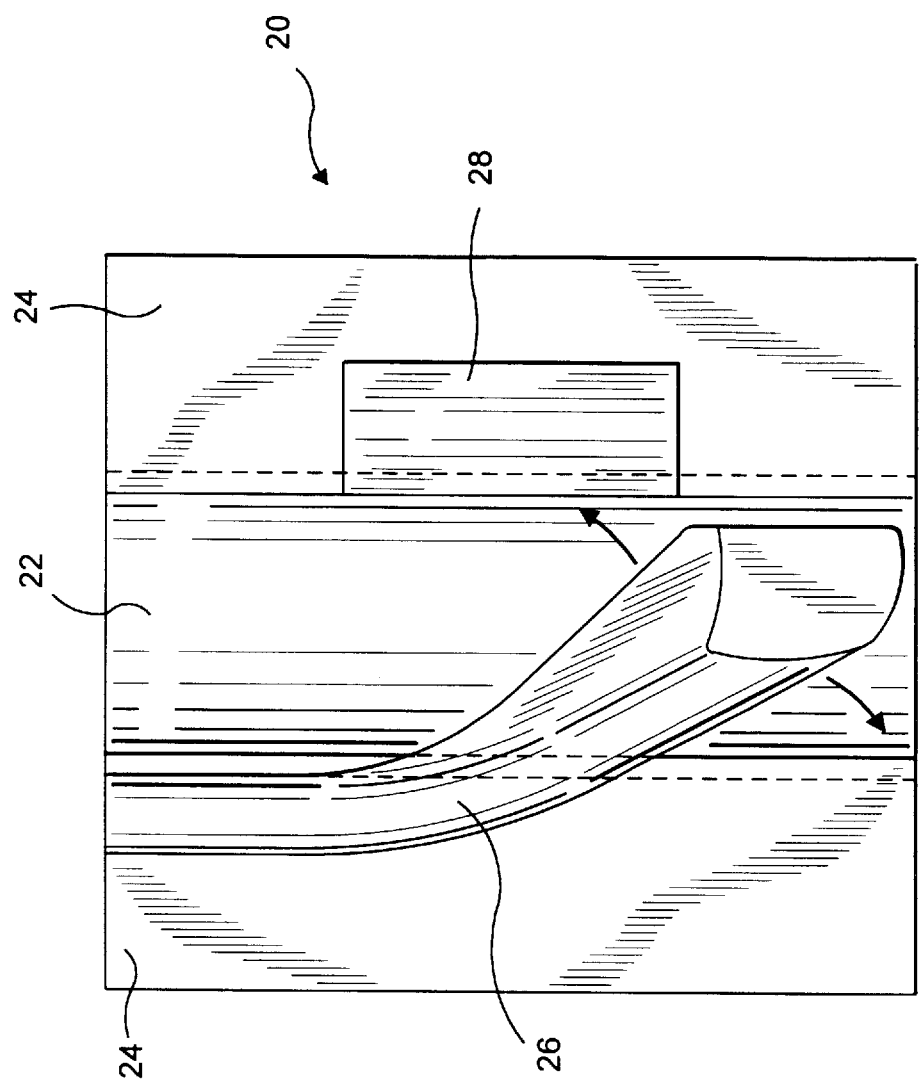
FIG. 2 is a top plan view of the routing clip shown in FIG. 1.

FIG. 2 is a top plan view of the routing clip 20 shown in FIG. 1. Inwardly curving projection 26 extends beyond the centerline of the routing clip 20 represented by the dashed line in the figure.

Figure 3:
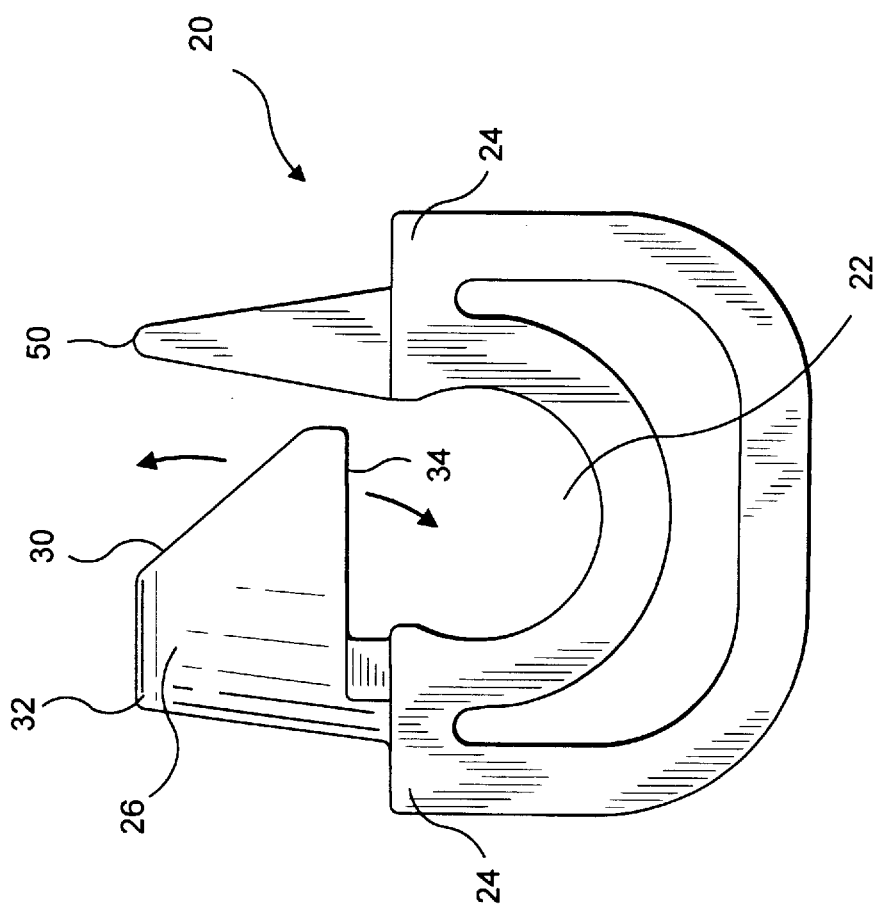
FIG. 3 is a front elevational view of the routing clip shown in FIG. 1.

FIG. 3 is a front elevational view of the routing clip shown in FIG. 1. Inwardly curving projections 26 are thicker in a height direction, as apparent in FIG. 3, than in a width direction, as apparent in FIG. 2. Because of this difference, inwardly curving projection 26 will readily deflect in a radial direction, as indicated by the arrows in FIG. 2 but will not readily deflect in the vertical direction as indicated by the arrows in FIG. 3. Consequentially, inwardly curving projection 26 will deflect radially, that is, perpendicularly to the insertion force, when a conduit is being inserted into the U-shaped channel 22. The bevel 30 of the upper surface 32 of the inwardly curving projection 26 facilitates this deflection. Once the conduit is fully inserted into the U-shaped channel 22, the resiliency of the inwardly curving projection 26 causes the inwardly curving projection 26 to return to its normal, or rest, position. Guide wall 28 assists in guiding the conduit into the U-shaped channel 22 during insertion thereof.

By contrast, the lower surface 34 of the inwardly curving projection 26 is flat, so that inwardly curving projection 26 will not readily deflect radially outwardly against a force removing a tube from U-shaped channel 22. With a sufficient extraction force, however, inwardly curving projection 26 will deflect parallel to the extraction force and permit removal of the conduit from the U-shaped channel 22. Once the conduit is fully removed from the routing clip 20, the resiliency of inwardly curving projection 26 will cause inwardly curving projection 26 to return to its normal, or rest, position.

Figure 4:
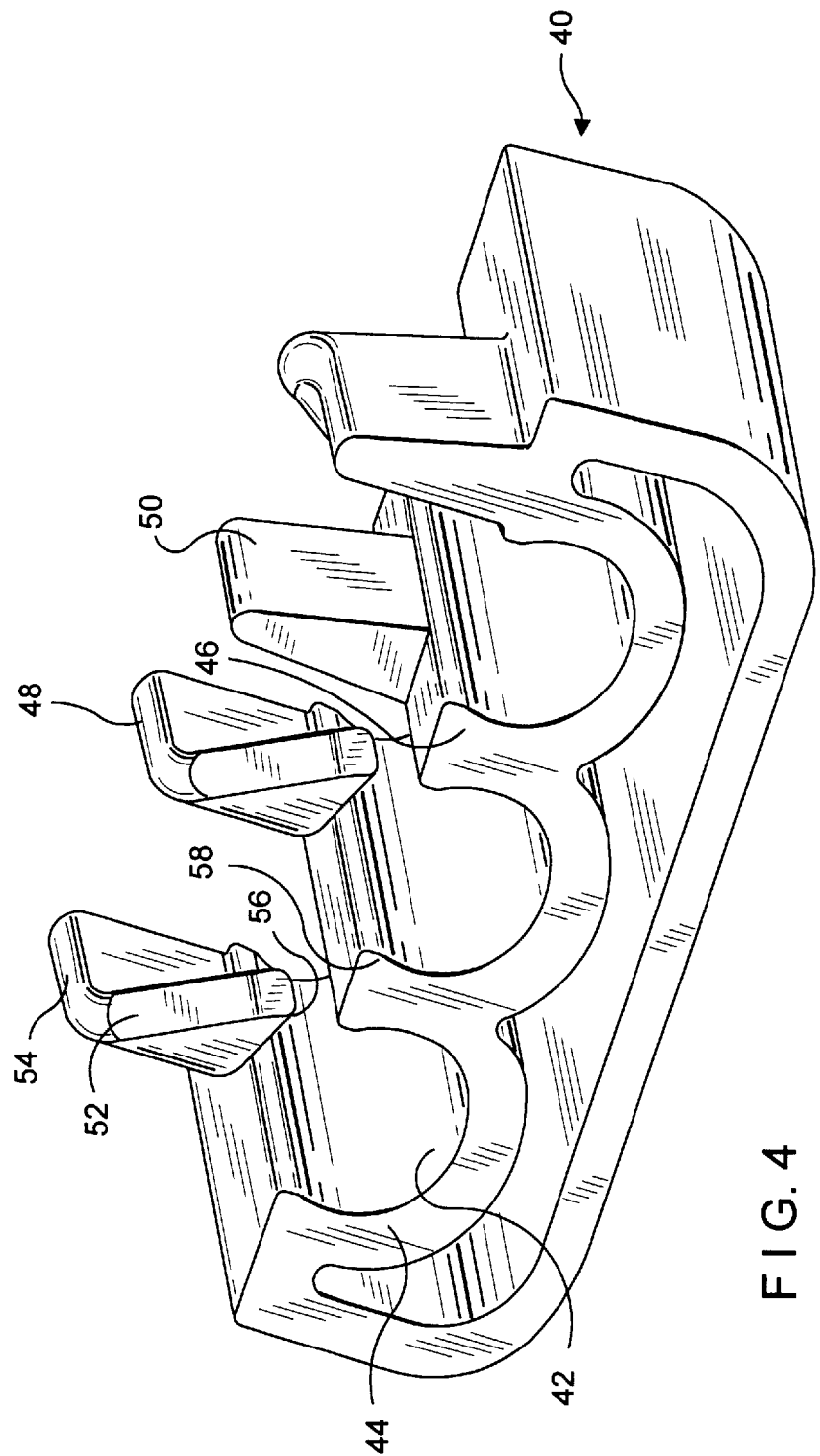
FIG. 4 is a perspective view of a second embodiment of the routing clip of the present invention.
Figure 5:
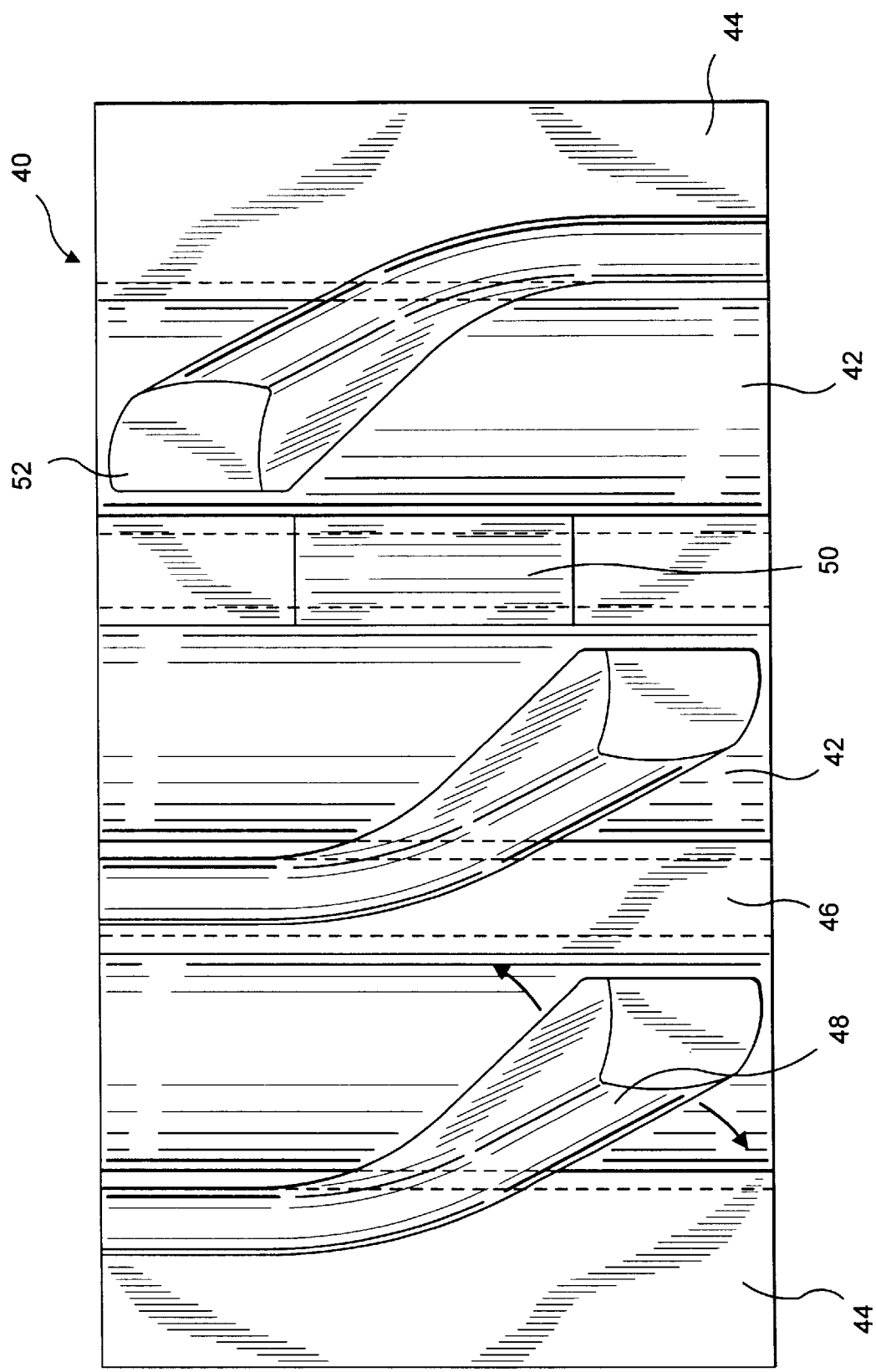
FIG. 5 is a top plan view of the routing clip shown in FIG. 4.
Figure 6:
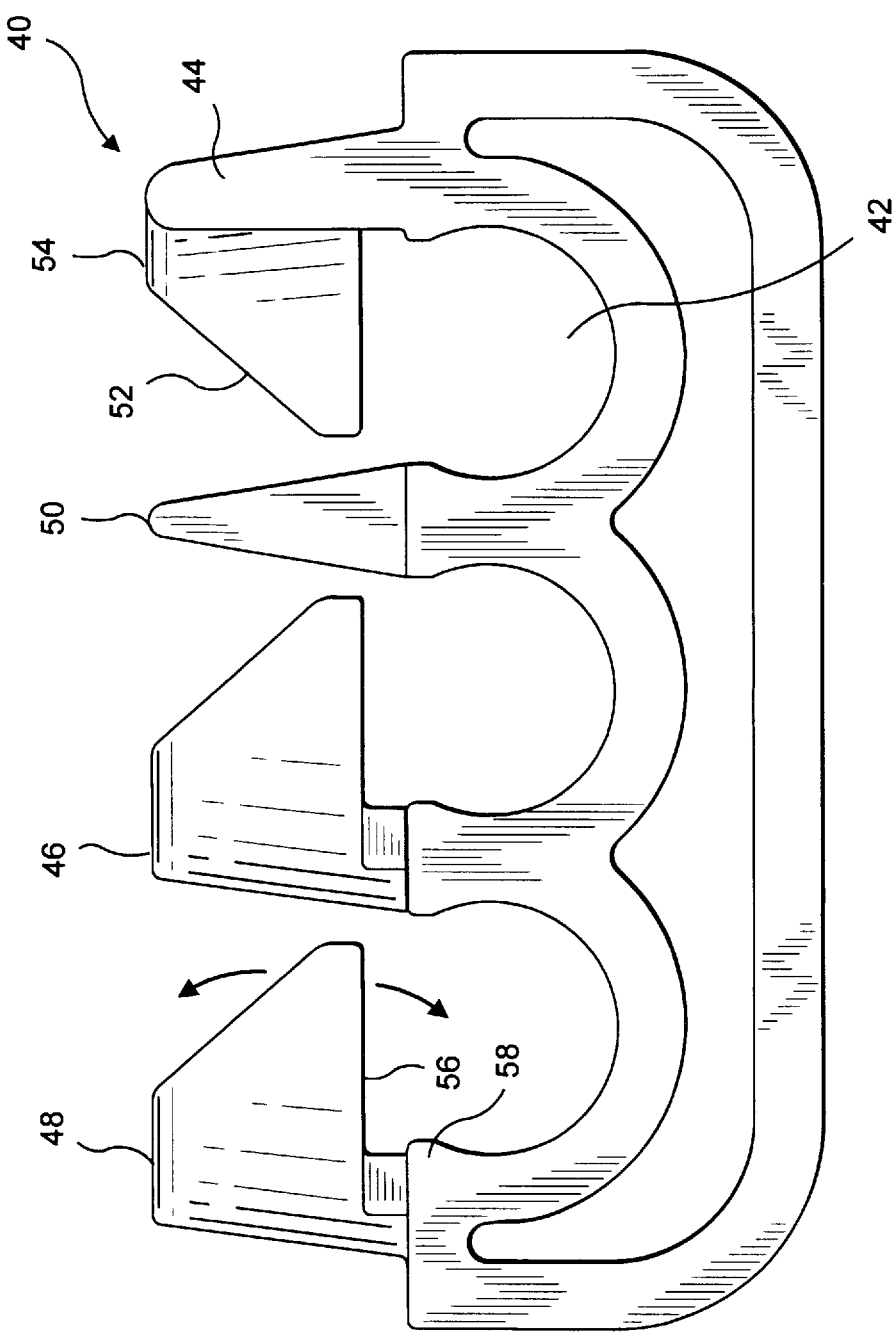
FIG. 6 is a front elevational view of the routing clip shown in FIG. 4.

FIG. 4 is a perspective view of a multiple routing clip 40 in accordance with a second embodiment of the present invention. This second embodiment of the present invention is directed at securing several conduits to a support. Multiple routing clip 40 includes two or more parallel U-shaped channels 42. Each of the U-shaped channels 42 has two substantially parallel upstanding walls. Thus, each of the outer of the U-shaped channels 42 forms an exterior wall 44. Depending upon the number of U-shaped channels 42, multiple routing clip 40 will include at least one interior wall 46, which is substantially parallel to exterior walls 44. Each interior wall 46 is common to two adjacent U-shaped channels 42. It will be appreciated that the number of interior walls 46 included in multiple routing clip 40 will be one less than the number of U-shaped channels 42. That is, multiple routing clip 40 will include one less U-shaped channel 42 than the total number of interior walls 46 and exterior walls 44. Multiple routing clip 40 includes an inwardly curving projection 48 corresponding to each U-shaped channel 42. Each inwardly curving projection 48 has an upper surface 54, having a bevel 52, and a lower surface 56. Each inwardly curving projection 48 which projects from an interior wall 46 will function also as a guide wall to guide the conduit into an adjacent U-shaped channel 42. Thus, multiple routing clip 40 requires only one guide wall 50, which will project from one of the interior walls 46 or exterior walls 44. Each upstanding wall 44, 46 may include an inward projection 58 which will further enhance the retention of the conduit within the multiple routing clip 40. In all other respects, the multiple routing clip 40 shown in FIG. 4 is identical to the single version shown in FIG. 1.

It will be appreciated that the routing clip 20 shown in FIG. 1 may include a plurality of inwardly curving projections 26 to increase the retention of an installed conduit. Similarly, it will be appreciated that the multiple routing clip 40 may include a plurality of inwardly curving projections 48 corresponding to each U-shaped channel. Whether a single routing clip or a multiple routing clip, the routing clip may include any means of fastening the routing clip to a support.

Thus, the several aforementioned objects and advantages are most effectively attained. Although two preferred embodiments of the invention have been disclosed and described in detail herein, it should be understood that this invention is in no sense limited thereby and its scope is to be determined by that of the appended claims.

What is claimed is:

1. A routing clip for fixing at least one conduit to a support, said routing clip being integrally molded from a resilient material, said routing clip comprising with respect to each of said at least one conduit:

a U-shaped channel having a centerline, said centerline extending along a longitudinal axis of said channel;

two substantially parallel walls extending from said U-shaped channel; and a projection on one of said two substantially parallel walls, said projection curving inwardly toward said centerline of said U-shaped channel;

wherein said projection is deflected in a plane substantially perpendicular to an insertion force when said conduit is being inserted into said U-shaped channel, said projection then relaxing when said conduit is fully inserted into said U-shaped channel;

and wherein said projection is deflected in a plane substantially parallel to an extraction force when said conduit in said U-shaped channel is being pulled outwardly therefrom, said projection then relaxing when said conduit is fully removed from said routing clip.

2. The routing clip according to claim 1, wherein a top surface of said projection has a bevel and a bottom surface of said projection is substantially parallel to said centerline.

3. The routing clip according to claim 1, wherein said inwardly curving projection extends beyond the centerline of said U-shaped channel.

4. The routing clip according to claim 1, wherein said substantially parallel walls each have said inwardly curving projection above said U-shaped channel.

5. The routing clip according to claim 1, wherein said inwardly curving projection is atop one of said two substantially parallel walls.

6. The routing clip according to claim 1, wherein said substantially parallel walls have concavely rounded surfaces.

7. The routing clip according to claim 1, further comprising a means for attaching said routing clip to said support.

8. The routing clip according to claim 1, wherein said resilient material is nylon 6/6.

* * * * *